United States Patent
Gebhard et al.

(10) Patent No.: US 6,846,867 B2
(45) Date of Patent: Jan. 25, 2005

(54) AQUEOUS COATING COMPOSITION WITH IMPROVED ADHESION TO FRIABLE SURFACES

(75) Inventors: Matthew Steward Gebhard, New Britain, PA (US); Kathleen Anne Koziski, Lansdale, PA (US)

(73) Assignee: Rohm and Haas Company, Philadelphia, PA (US)

(*) Notice: Subject to any disclaimer, the term of this patent is extended or adjusted under 35 U.S.C. 154(b) by 121 days.

(21) Appl. No.: 10/055,492

(22) Filed: Oct. 29, 2001

(65) Prior Publication Data

US 2002/0107322 A1 Aug. 8, 2002

Related U.S. Application Data

(60) Provisional application No. 60/244,786, filed on Nov. 1, 2000.

(51) Int. Cl.[7] .................................................. C08K 5/06
(52) U.S. Cl. ........................................ 524/375; 524/376
(58) Field of Search ................................ 524/375, 376, 524/757, 761

(56) References Cited

U.S. PATENT DOCUMENTS

| | | | | |
|---|---|---|---|---|
| 3,284,394 A | * | 11/1966 | Suen et al. ................... | 524/100 |
| 3,320,196 A | * | 5/1967 | Rogers ......................... | 524/272 |
| 3,594,337 A | * | 7/1971 | Shea ............................ | 524/339 |
| 3,637,563 A | * | 1/1972 | Christena .................... | 523/305 |
| 3,699,069 A | * | 10/1972 | Peaker ......................... | 524/460 |
| 3,701,745 A | * | 10/1972 | Herman et al. .............. | 524/753 |
| 3,738,991 A | * | 6/1973 | Reed ............................ | 523/410 |
| 3,847,857 A | * | 11/1974 | Haag et al. .................. | 524/530 |
| 4,345,044 A | * | 8/1982 | Columbus et al. ........... | 523/220 |
| 4,490,491 A | * | 12/1984 | Devona et al. .............. | 523/318 |
| 4,722,965 A | | 2/1988 | Wong et al. | |
| 4,771,100 A | | 9/1988 | Das et al. | |
| 5,035,944 A | | 7/1991 | Frazza et al. | |
| 5,082,895 A | * | 1/1992 | Wolff et al. .................. | 524/820 |
| 5,202,378 A | | 4/1993 | Barnett | |
| 5,534,310 A | * | 7/1996 | Rokowski et al. ........... | 427/494 |
| 5,616,419 A | * | 4/1997 | Hsu et al. .................... | 428/512 |
| 5,623,085 A | * | 4/1997 | Gebhard et al. ............. | 560/25 |

FOREIGN PATENT DOCUMENTS

| | | |
|---|---|---|
| DE | 1 354 436 | 5/1974 |
| EP | 0 593 151 | 4/1994 |
| EP | 0 916 707 | 5/1999 |
| EP | 0 658 608 B1 | 10/2000 |

OTHER PUBLICATIONS

Dow Chemical Company, Midland, MI, "Gloss White Paint Formulation Suggestion E–2522," http://www.dow.com, 2004.

Dow Chemical Company, Midland, MI "31% PVC All–Acrylic Paint Formulation Suggestion E–2496," http://www.dow.com, 2004.

* cited by examiner

*Primary Examiner*—Judy M. Reddick
(74) *Attorney, Agent, or Firm*—Carl P. Hemenway

(57) ABSTRACT

An aqueous coating composition having improved adhesion to friable surfaces including an emulsion polymer of certain compositions and certain acid numbers having a glass transition temperature of −20° C. to 100° C. and an average particle diameter less than 120 nanometers, and certain water-soluble ethoxylates is provided. In addition, a method for improving adhesion to friable surfaces by using the aqueous coating compositions of the invention is provided.

4 Claims, No Drawings

US 6,846,867 B2

AQUEOUS COATING COMPOSITION WITH IMPROVED ADHESION TO FRIABLE SURFACES

CROSS REFERENCE TO RELATED PATENT APPLICATIONS

This application claims the benefit of the filing date of U.S. provisional application Ser. No. 60/244,786 filed Nov. 1, 2000.

This invention relates to an aqueous coating composition having improved adhesion to friable surfaces, such as chalky weathered paint surfaces and masonry surfaces. The invention relates further to a method for improving the adhesion of a dried aqueous coating composition to a friable surface.

The present invention serves to provide a dried coating which has improved adhesion to a friable surface. Coatings are frequently desirably applied to surfaces which are both porous and weak, i.e., subject to attrition on abrasion such as, for example, chalky surfaces of coatings which have weathered to an extent that poorly consolidated pigment forms a surface layer on the coating and masonry surfaces, weathered or not, which have a poorly consolidated surface. A substrate to which a coating is applied may have an entirely friable surface or only portions of the surface may be friable. Such substrates present a problem to the applicator in that, without being bound by this mechanism, the aqueous coating composition may not penetrate the weak boundary layer of the friable surface or friable surface areas sufficiently to provide a dry coating with the requisite degree of adhesion to the substrate below the weak surface.

U.S. Pat. No. 4,771,100 discloses the use of ethoxylated fatty amines in the preparation of latexes having polymer particles containing about 0.1 to 10 weight percent of copolymerized carboxylic acid monomer, and having particle sizes between 889 and 1091 Angstroms for use as coatings. No use of these latexes, in combination with ethoxylated fatty amines, to improve adhesion to friable surfaces was disclosed.

The problem faced by the inventors is the provision of a suitable aqueous coating composition and a method for improving the adhesion of a coating so that that adhesion to friable surfaces can be effected. We have now found that that certain polymer compositions used in conjunction with water-soluble alkyl phenol alkoxylates, alkyl alcohol alkoxylates, and mixtures thereof, provide improved adhesion to friable surfaces relative to alternative compositions. In addition, we have found that alkyl phenol ethoxylates, alkyl alcohol ethoxylates, and mixtures thereof are particularly useful in conjunction with the polymer compositions.

In a first aspect of the present invention, there is provided an aqueous coating composition having improved adhesion to friable surfaces including:
(a) an emulsion polymer having a glass transition temperature of −20° C. to 100° C. and an average particle diameter less than 120 nanometers, said emulsion polymer consisting essentially of:
  (i) at least one copolymerized ethylenically unsaturated nonionic monomer, each of said nonionic monomer(s) having a water solubility less than 8%; and
  (ii) at least one copolymerized acid monomer, such that the acid number of said emulsion polymer is 30 to 100; and
(b) 0.25–10%, by weight based on said emulsion polymer weight, nonionic surfactants selected from the group consisting of water-soluble alkyl phenol ethoxylates, alkyl alcohol ethoxylates, and mixtures thereof.

In a second aspect of the present invention, there is provided an aqueous coating composition having improved adhesion to friable surfaces including:
(a) an emulsion polymer having a glass transition temperature of −20° C. to 100° C. and an average particle diameter less than 120 nanometers, said emulsion polymer consisting essentially of:
  (i) 8–99.5%, by weight based on said emulsion polymer weight, of at least one copolymerized ethylenically unsaturated first nonionic monomer, each of said first nonionic monomer(s) having a water solubility of at least 8%;
  (ii) 0–91.5%, by weight based on said emulsion polymer weight, of at least one copolymerized ethylenically unsaturated second nonionic monomer, each of said second nonionic monomer(s) having a water solubility of less than 8%; and
  (iii) at least 0.5%, by weight based on said emulsion polymer weight, of at least one copolymerized acid monomer, such that the acid number of said emulsion polymer is 4 to 100; and
(b) 0.25–10%, by weight based on said emulsion polymer weight, nonionic surfactants selected from the group consisting of water-soluble alkyl phenol ethoxylates, alkyl alcohol ethoxylates, and mixtures thereof.

In a third aspect of the present invention there is provided a method for improving the adhesion of a dried aqueous coating composition to a friable surface including:
(1) forming an aqueous coating composition including:
(a) an emulsion polymer having a glass transition temperature of −20° C. to 100° C. and an average particle diameter less than 120 nanometers, said emulsion polymer consisting essentially of:
  (i) at least one copolymerized ethylenically unsaturated nonionic monomer, each of said nonionic monomer(s) having a water solubility less than 8%; and
  (ii) at least one copolymerized acid monomer, such that the acid number of said emulsion polymer is 30 to 100; and
(b) 0.25–10%, by weight based on said emulsion polymer weight, nonionic surfactants selected from the group consisting of water-soluble alkyl phenol ethoxylates, alkyl alcohol ethoxylates, and mixtures thereof; and
(2) applying said aqueous coating composition to a surface; and
(3) drying, or allowing to dry, said aqueous coating composition.

In a fourth aspect of the present invention there is provided a method for improving the adhesion of a dried aqueous coating composition to a friable surface including:
(1) forming an aqueous coating composition including:
(a) an emulsion polymer having a glass transition temperature of −20° C. to 100° C. and an average particle diameter less than 120 nanometers, said emulsion polymer consisting essentially of:
  (i) 8–99.5%, by weight based on said emulsion polymer weight, of at least one copolymerized ethylenically unsaturated first nonionic monomer, each of said first nonionic monomer(s) having a water solubility of 8% or more;
  (ii) 0–91.5%, by weight based on said emulsion polymer weight, of at least one copolymerized ethylenically unsaturated second nonionic monomer, each of said second nonionic monomer(s) having a water solubility of less than 8%; and
  (iii) at least 0.5%, by weight based on said emulsion polymer weight, of at least one copolymerized acid monomer, such that the acid number of said emulsion polymer is 4 to 100; and (b) 0.25–10%, by weight based on said emulsion polymer weight, nonionic surfactants selected from the group consisting of water-soluble alkyl phenol ethoxylates, alkyl alcohol ethoxylates, and mixtures thereof; and (2) applying said aqueous coating composition to a surface; and (3) drying, or allowing to dry, said aqueous coating composition.

The aqueous coating composition contains a waterborne emulsion polymer. The emulsion polymer contains at least one copolymerized nonionic ethylenically-unsaturated monomer, such as, for example, a (meth)acrylic ester monomer including methyl acrylate, ethyl acrylate, butyl acrylate, 2-ethylhexyl acrylate, decyl acrylate, methyl methacrylate, butyl methacrylate, hydroxyethyl methacrylate, hydroxypropyl methacrylate, aminoalkyl (meth)acrylate; styrene or substituted styrenes; butadiene; vinyl acetate or other vinyl esters; vinyl monomers such as vinyl chloride, vinylidene chloride, N-vinyl pyrollidone; (meth)acrylonitrile and (meth)acrylamide. The use of the term "(meth)" followed by another term such as acrylate or acrylamide, as used throughout the disclosure, refers to both acrylates and acrylamides and methacrylates and methacrylamides, respectively.

The water solubility of the nonionic monomers incorporated into the emulsion polymers herein are defined as those determined using the Quantitative Structural Activity Relationship (QSAR) program. The program uses the molecular structure to estimate physical-chemical properties including, molecular weight, vapor pressure, solubility, bioconcentration factor, hydrolysis half-life, Henry's coefficient, partitioning data, and other parameters (based on Lyman, W., Reehl, W., and Rosenblatt, D. Handbook of Chemical Property Estimation Methods. Chapter 2 "Solubility in Water," McGraw Hill Book Co., New York, 1982). The QSAR database used to calculate the water solubility assessment is maintained by the Institute for Process Analysis, Montana State University (Bozeman, Mont., USA) and accessed through Tymnet Data Systems and Numerica Online Systems (Numericom. 1994. The Online Interface for Numerica Users); and Technical Data Base Services, Inc. (TDS, 135 West 50th Street, New York, N.Y. 10020). Some water solubilities are presented in Table 1.

TABLE 1

Water Solubilities of Monomers

| Monomer | Water Solubility by QSAR Method (grams per 100 grams of water) |
|---|---|
| BA | 0.465 |
| EA | 2.88 |
| EHA | 0.0172 |
| MMA | 4.17 |
| Sty | 0.0672 |
| VA | 9.65 |
| AAEM | 8.00 |

The emulsion polymer has a certain acid number range resulting from at least one copolymerized monoethylenically-unsaturated acid monomer such as, for example, acrylic acid, methacrylic acid, crotonic acid, itaconic acid, sulfoethyl methacrylate, phosphoroethyl methacrylate, fumaric acid, maleic acid, monomethyl itaconate, monomethyl fumarate, monobutyl fumarate, and maleic anhydride. The acid number of the emulsion polymer of the first and third aspects of the present invention is 30 to 100, preferably 30 to 50, more preferably 39 to 50. The acid number of the emulsion polymer of the second and fourth aspects of the present invention is 4 to 100, preferably 8 to 50.

The emulsion polymer used in this invention is substantially thermoplastic, or substantially uncrosslinked, when it is applied to the surface, although low levels of deliberate or adventitious crosslinking may be present. When low levels of precrosslinking or gel content are desired low levels of nonionic multi-ethylenically unsaturated monomers such as, for example, 0. 1%–5%, by weight based on the weight of the emulsion-polymerized polymer, allyl methacrylate, diallyl phthalate, 1,3-butylene glycol dimethacrylate, 1,6-hexanedioldiacrylate, and divinyl benzene may be used. It is important, however, that the quality of the film formation is not materially impaired.

The polymerization techniques used to prepare emulsion polymers are well known in the art. In the preparation of emulsion polymers conventional surfactants may be used such as, for example, anionic and/or nonionic emulsifiers such as alkali or ammonium alkyl sulfates, alkyl sulfonic acids, fatty acids, and oxyethylated alkyl phenols. The amount of surfactant used is usually up to 6% by weight, based on the weight of total monomer. Either thermal or redox initiation processes may be used. Conventional free radical initiators may be used such as, for example, hydrogen peroxide, t-butyl hydroperoxide, and ammonium and/or alkali persulfates, typically at a level of 0.05% to 3.0% by weight, based on the weight of total monomer. Redox systems using the same initiators coupled with a suitable reductant such as, for example, sodium bisulfite may be used at similar levels. Chain transfer agents such as, for example, alkyl mercaptans may be used in order to moderate the molecular weight of the polymer.

The emulsion polymer has an average particle diameter less than 120 nanometers, preferably less than 100 nanometers, more preferably less than 80 nanometers, most preferably less than 70 nanometers. Particle sizes herein are those determined using a Brookhaven Model BI-90 particle sizer manufactured by Brookhaven Instruments Corporation, Holtsville N.Y. Reported as "effective diameter."

The glass transition temperature ("Tg") of the emulsion polymer is −20° C. to 100° C. Tgs used herein are those calculated by using the Fox equation (T.G. Fox, Bull. Am. Physics Soc., Volume 1, Issue No. 3, page 123(1956)). that is, for calculating the Tg of a copolymer of monomers M1 and M2, $$1/Tg(calc.) = w(M1)/Tg(M1) + w(M2)/Tg(M2)$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers may be found, for example, in "Polymer Handbook," edited by J. Brandrup and E. H. Immergut, Interscience Publishers.

The aqueous coating composition includes one or more nonionic surfactants selected from the group including alkylphenol alkoxylates, alkyl alcohol alkoxylates, and mixtures thereof, wherein at least 50% by weight of the alkoxyl groups, based on total alkoxyl groups, derives from ethylene oxide and less than 50% by weight of the alkoxyl groups derives from $C_3$–$C_4$ alkylene oxide. More preferably, the nonionic surfactant is selected from the group including alkylphenol ethoxylates, alkyl alcohol ethoxylates, and mixtures thereof. An effective amount of nonionic surfactant is 0.1–10 weight %, preferably 0.25–10 weight %, more preferably 0.5–8 weight %, and most preferably 1–8 weight %, calculated as dry weight of surfactant based on the total dry weight of the emulsion polymer.

Useful alkylphenol alkoxylates have the general structure

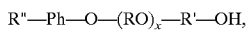

R"—Ph—O—(RO)$_x$—R'—OH, where Ph is a phenyl group; R is $C_2$ alkyl or mixtures of $C_2$ alkyl with one or more of $C_1$, $C_3$, and $C_4$ alkyl or mixtures thereof, mixtures disposed randomly or in sequences (blocks), wherein $C_2$ alkyl is present in the amount such that at least 50 weight percent of the polymerized units derived from alkylene oxides are derived from ethylene oxide; R' is $C_1$–$C_5$ alkyl; R" is $C_1$–$C_{24}$ alkyl; and "x" is preferably 1 to 100, more preferably 4 to 50, and most preferably 6–50. Alkylphenol ethoxylates are preferred. Alkylphenol ethoxylates include polyoxyethylene nonylphenol ethers, polyoxyethylene octylphenol ethers, tert-octylphenoxyethylpoly(39) ethoxyethanol, and nonylphenoxyethyl poly(40) ethoxyethanol. TRITON™ X-405 (70% aqueous), an alkylphenol ethoxylate, is available from Union Carbide Corporation.

Useful alkyl alcohol alkoxylates have the general structure

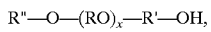

R"—O—(RO)$_x$—R'—OH, where R is $C_2$ alkyl or mixtures of $C_2$ alkyl with one or more of $C_1$, $C_3$, and $C_4$ alkyl or mixtures thereof, mixtures disposed randomly or in sequences (blocks), wherein $C_2$ alkyl is present in the amount such that at least 50 weight percent of the polymerized units derived from alkylene oxides are derived from ethylene oxide; R' is $C_1$–$C_5$ alkyl; R" is $C_1$–$C_{30}$ alkyl; and "x" is preferably 1 to 100, more preferably 4 to 50, and most preferably 6–50. Alkyl alcohol ethoxylates are preferred. They include polyoxyethylene higher alcohol ethers such as, for example, polyoxyethylene lauryl ethers, polyoxyethylene stearyl ethers, and TERGITOL™ 15-S-40 (25% aqueous), an alkyl alcohol ethoxylate available from Union Carbide Corporation.

The amount of pigment in the aqueous coating composition may vary from a pigment volume concentration (PVC) of 0 to 75 and thereby encompass coatings otherwise described, for example, as clear coatings, semi-gloss or gloss coatings, flat coatings, and primers.

The aqueous coating composition is prepared by techniques which are well known in the coatings art. First, if the coating composition is to be pigmented, at least one pigment is well dispersed in an aqueous medium under high shear such as is afforded by a COWLES™ mixer or, in the alternative, at least one predispersed pigment may be used. Then the emulsion polymer, selected surfactant and alkyl polyglycoside is added under low shear stirring along with other coatings adjuvants as desired. Alternatively, either or both of the selected surfactant and alkyl polyglycoside may have been previously added to the emulsion polymer before, during, or subsequent to the preparation of the emulsion polymer. Alternatively, the emulsion polymer may be present during the pigment dispersion step. The aqueous coating composition may contain conventional coatings adjuvants such as, for example, emulsifiers, buffers, neutralizers, coalescents, thickeners or rheology modifiers, freeze-thaw additives, wet-edge aids, humectants, wetting agents, biocides, antifoaming agents, colorants, waxes, and anti-oxidants. The aqueous coating composition may contain up to 75%, by weight based on the total dry weight of the polymer, of an emulsion polymer not meeting the limitations of the emulsion polymer of the first or second aspect of the present invention.

The solids content of the aqueous coating composition may be from 25% to 60% by volume. The viscosity of the aqueous polymeric composition may be from 50 KU (Krebs Units) to 120 KU as measured using a Brookfield Digital viscometer KU-1; the viscosities appropriate for different application methods vary considerably.

The presence and amount of friable material on a surface can be determined using the method of ASTM Test Method D-659. In this test method the lower the rating the more friable material present. The dry coating compositions of this invention have been evaluated and are beneficially used over substrates having surfaces with a rating of 3 or less. A "friable surface" herein is defined as one which has a rating of 3 or less determined by the above method. An alternative approach to determining the presence and amount, actually the depth, of friable material, is to repeatedly adhere a piece of tape onto an area of the surface and remove the friable material. This is continued until no more friable material is visually detected on the tape. At that point the depth can be determined quantitatively by using a suitable microscopic technique such as scanning electron microscopy. Using this test method we found that the test substrates of the examples had at least 10 microns of friable material on their surfaces.

Conventional coatings application methods such as, for example, brushing, rolling, and spraying methods such as, for example, air-atomized spray, air-assisted spray, airless spray, high volume low pressure spray, and air-assisted airless spray may be used in the method of this invention. The aqueous coating composition may be advantageously applied to substrates such as, for example, weathered paint and friable cementitious substrates such as, for example, stucco and mortar but may also be applied to other architectural substrates. Drying is typically allowed to proceed under ambient conditions such as, for example, at 0° C. to 35° C.

All ranges used herein are inclusive and combinable.
Glossary

Used herein, the following abbreviations and terms have these meanings:

AAEM=2-(Acetoacetoxy)ethyl methacrylate
ALS=Ammonium lauryl sulfate (28% active)
BA=Butyl acrylate
MAA=Methacrylic acid
MMA=Methyl methacrylate
n-DDM=n-Dodecyl mercaptan
SLS=Sodium lauryl sulfate (28% active)
STY=Styrene
VA=Vinyl acetate
PVC=pigment volume concentration
P.S.=particle size in nanometers (nm)
redox=reduction/oxidation (e.g., redox initiation system for polymerization)
volume solids=the portion of the total volume of the aqueous dispersion that is occupied by nonvolatile material.
ATTAGEL™ 50 is a clay, available from Engelhard Minerals & Chemicals Corp., Houston, Tex.

ACRYSOL™ RM-2020NPR is a urethane rheology modifier available from Rohm and Haas Company, Philadelphia, Pa.

BUBBLEBREAKER™ 625 is a defoamer available from Witco Corp., Phillipsburg, N.J.

MINEX™ 4 is an aluminosilicate extender available from Unimin Specialty Minerals Inc., Tamms, Ill.

NATROSOL™ 250 HBR is a hydroxyethylcellulose available from Hercules Incorporated, New York, N.Y.

NAXONAC™ 690 is a phosphate surfactant available from Ruetgers-Nease Chem. Co. Inc.

4% PLURONIC™ L-45 is a polypropyleneoxide/polyethyleneoxide block copolymer surfactant available from BASF Corp., Ludwigshafen, Germany.

TAMOL™ 1124 is a surfactant available from Rohm and Haas Company, Philadelphia, Pa.

TERGITOL™ 15-S-40 is $C_{11}$–$C_{15}$ secondary alcohol ethoxylate available from Union Carbide Corporation, Danbury, Conn.

TEXANOL™ is available from Eastman Chemicals, Eastman, Tenn.

TI-PURE™ R-902 is titanium dioxide available from E. I. duPont & Company, Wilmington, Del.

TRITON™ X-405 (70% aqueous) is an alkylphenol ethoxylate available from Union Carbide Corporation.

The following examples are presented to illustrate the invention and the results obtained by the test procedures.

EXAMPLE 1

Preparation of Emulsion Polymer

The polymerization was carried out in a five-liter, four-neck, round bottom glass flask equipped with a mechanical blade stirrer, a thermocouple to monitor temperature, a reflux condenser, and a means to heat and cool. The flask was charged with 1650 g deionized water, and heated to 87° C. while being swept with $N_2$. A monomer preemulsion was prepared from 494 g deionized water, 16.1 g SLS, 835.5 g BA, 544.5 g MMA and 120.0 g MAA. SLS (49.2 g) and 3.74 g ammonium persulfate were added to the flask along with 90 g deionized water. The monomer preemulsion was then added over two hours at 85° C. Over the course of the reaction, 0.82 g ammonium persulfate dissolved in 115 g deionized water was also added to the flask in a separate stream. When the addition was complete, the flask was cooled and 2.24 g 70% aqueous t-butyl hydroperoxide, 1.12 g sodium formaldehyde sulfoxylate and 0.008 g of iron sulfate heptahydrate were added in a total of 150 g deionized water. Ammonium hydroxide (13.0 g of a 28% aqueous solution) in 45 g deionized water was then added. Deionized water rinses were added throughout the polymerization. The resulting emulsion had a solids content of 35.7% by weight, a particle size of 48 nm, and a pH of 6.7.

EXAMPLE 2

Preparation of Aqueous Coating Compositions

Using the ingredients given in Table 2.1, aqueous coating compositions were prepared. The grind premix was made and mixed on a high speed Cowles™ disperser for 20 minutes. The grind premix was transferred to another container and the let down ingredients were added in the order given. The final volume solids of the paint was 30 percent and the pigment volume concentration was 45%.

TABLE 2.1

Ingredients used in aqueous coatings composition

| Material | weight (grams) | | | | |
| --- | --- | --- | --- | --- | --- |
| | Comparative A | Coating 1 | Coating 2 | Coating 3 | Coating 4 |
| Grind Premix | | | | | |
| NATROSOL ™ 250 HBR (2.5% Aq.) | 83.80 | 83.80 | 83.80 | 83.80 | 83.80 |
| Propylene glycol | 13.89 | 13.89 | 13.89 | 13.89 | 13.89 |
| BUBBLEBREAKER ™ 625 | 0.77 | 0.77 | 0.77 | 0.77 | 0.77 |
| TAMOL ™ 1124 | 3.13 | 3.13 | 3.13 | 3.13 | 3.13 |
| TI-PURE ™ R-902 | 79.84 | 79.84 | 79.84 | 79.84 | 79.84 |
| MINEX ™ 4 | 95.01 | 95.01 | 95.01 | 95.01 | 95.01 |
| ATTAGEL ™ 50 | 2.46 | 2.46 | 2.46 | 2.46 | 2.46 |
| Let Down | | | | | |
| Example 1 emulsion (particle size = 48 nm) | 217.9 | 206 | 213.6 | 214.8 | 208 |
| TERGITOL ™ 15-S-40 25% aq. | — | 11.9 | — | — | — |
| TRITON ™ X-405 70% aq. | — | — | 4.3 | — | — |
| PLURONIC ™ L-45 | — | — | — | 3.04 | — |
| NAXONAC ™ 690 30% aq. | — | — | — | — | 9.9 |
| TEXANOL ™ | 5.06 | 4.98 | 5.15 | 5.19 | 5.02 |
| BUBBLEBREAKER ™ 625 | 0.8 | .8 | .8 | .8 | .8 |
| ACRYSOL ™ RM-2020NPR | 2.0 | 1.0 | 1.0 | 1.0 | 1.0 |
| Water | 41.9 | 41.9 | 41.0 | 42.9 | 42.9 |

EXAMPLE 3

Evaluation of Adhesion to Weathered Paint Chalk

Chalk adhesion was evaluated for the aqueous coating compositions using the following procedure. The aqueous coating compositions were applied using a brush over a weathered piece of aluminum siding which had a layer of chalk about 25 microns thick. Chalk is the remnants of the inorganic particles (metal oxides, various silicates, and possibly metal carbonates) that were used in the original paint.

The aqueous coating compositions were applied in two coats of 103 g/m² (1 gram per 15 in²). The first coat was allowed to dry for two hours before application of the second coat. The coated panels were then dried for approximately 24 hours. ASTM cross hatch (X-hatch) tape pull test method D-3359 was used to evaluate the adhesion. The percent of coating retained after pulling off the tape was recorded. 100 indicates complete adhesion while 0 indicates complete removal. A value of 100 is desired; however, experience has shown that values of 20–25% or greater indicate acceptably good adhesion. The adhesion data is given in table 3.1.

TABLE 3.1

Effect of Surfactant on Chalk Adhesion performance

| Coating (emulsion polymer particle size = 48 nm) | Surfactant | Cross hatch adhesion, % Retention |
|---|---|---|
| Comparative A | none | 50 |
| 1 | 4%$^{(a)}$TERGITOL ™ 15-S-40 $C_{11}$–$C_{15}$ secondary alcohol ethoxylate | 65 |
| 2 | 4% TRITON ™ X-405 alkylphenol ethoxylate | 88 |
| 3 | 4% PLURONIC ™ L-45 polypropyleneoxide/ polyethyleneoxide block copolymer surfactant | 41 |
| 4 | 4% NAXONAC ™ 690 phosphate surfactant | 30 |

$^{(a)}$Percentages of nonionic surfactants are calculated as dry weight of nonionic surfactant, based on the dry weight of the emulsion polymer.

The results in Table 3.1 show that alkyl phenol ethoxylates and alkyl alcohol ethoxylates (Tergitol 15-S-40 and Triton X-405, respectively) offer a measurable improvement in chalk adhesion of small particle size binders; however, polypropyleneoxide/polyethyleneoxide copolymer surfactants and phosphate surfactants (PLURONIC™ L-45 and NAXONAC™ 690, respectively) reduce the level of observed chalk adhesion.

We claim:

1. An aqueous coating composition having improved adhesion to friable surfaces comprising:
   (a) an emulsion polymer having a glass transition temperature of −20° C. to 100° C. and an average particle diameter less than 120 nanometers, said emulsion polymer consisting essentially of:
      (i) at least one copolymerized ethylenically unsaturated nonionic monomer, each of said nonionic monomer(s) having a water solubility less than 8% by weight based on the weight of water; and
      (ii) at least one copolymerized acid monomer, such that the acid number of said emulsion polymer is 30 to 100;
   wherein said emulsion polymer is made without the use of chain transfer agent; and
   (b) 0.25–10%, by dry weight based on the dry weight of said emulsion polymer, nonionic surfactant selected from the group consisting of water-soluble alkyl phenol ethoxylates, alkyl alcohol ethoxylates, and mixtures thereof.

2. The coating composition of claim 1 wherein the acid number of said emulsion polymer is 39 to 50.

3. The coating composition of claim 1 wherein the average particle diameter of said emulsion polymer is less than 80 nanometers.

4. The composition of claim 1 wherein the amount of said nonionic surfactant is 3–8% by dry weight based on the dry weight of said emulsion polymer.

* * * * *